US011963213B2

(12) United States Patent
Sundararajan et al.

(10) Patent No.: US 11,963,213 B2
(45) Date of Patent: Apr. 16, 2024

(54) INTERFERENCE VARIATION INDICATION

(71) Applicant: QUALCOMM Incorporated, San Diego, CA (US)

(72) Inventors: Jay Kumar Sundararajan, San Diego, CA (US); Ahmed Elshafie, San Diego, CA (US); Yi Huang, San Diego, CA (US); Wanshi Chen, San Diego, CA (US); Naga Bhushan, San Diego, CA (US); Prashanth Haridas Hande, San Diego, CA (US); Yeliz Tokgoz, San Diego, CA (US); Krishna Kiran Mukkavilli, San Diego, CA (US); Wei Yang, San Diego, CA (US); Saadallah Kassir, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 17/446,811

(22) Filed: Sep. 2, 2021

(65) Prior Publication Data
US 2022/0078811 A1 Mar. 10, 2022

Related U.S. Application Data

(60) Provisional application No. 62/706,737, filed on Sep. 7, 2020.

(51) Int. Cl.
*H04W 72/12* (2023.01)
*H04L 1/00* (2006.01)
(Continued)

(52) U.S. Cl.
CPC ........ *H04W 72/542* (2023.01); *H04L 1/0003* (2013.01); *H04W 72/1273* (2013.01); *H04W 72/23* (2023.01)

(58) Field of Classification Search
CPC ........... H04W 72/542; H04W 72/1273; H04W 72/23; H04L 1/0003; H04L 1/0025;
(Continued)

(56) References Cited

U.S. PATENT DOCUMENTS

2010/0173637 A1* 7/2010 Damnjanovic ....... H04W 16/12
455/447
2016/0323888 A1* 11/2016 Ryu ...................... H04W 72/52
(Continued)

*Primary Examiner* — Hoang-Chuong Q Vu
(74) *Attorney, Agent, or Firm* — Haynes and Boone, LLP

(57) ABSTRACT

Wireless communication devices, systems, and methods related to mechanisms to implement improved interference tracking over time. A BS may transmit information to a UE that allows the UE to quantize channel measurements into interference states. The UE may transmit an interference change report as triggered by an event, such as an interference metric exceeding a threshold after quantizing into the interference states. This enables the system to capture and respond to abrupt changes. Further, the interference change report may include historic interference information. The UE may include statistics based on the historic interference information. The UE may further be triggered to transmit an interference change report in response to a BS requesting it, or in response to a configured period of time elapsing. The UE may further include MCS information predicted for one or more future time periods based on historic information, which the BS may use in scheduling.

30 Claims, 8 Drawing Sheets

(51) Int. Cl.
*H04W 72/1273* (2023.01)
*H04W 72/23* (2023.01)
*H04W 72/542* (2023.01)

(58) Field of Classification Search
CPC ... H04L 1/0026; H04L 5/0053; H04L 5/0048; H04J 11/0023
See application file for complete search history.

(56) References Cited

U.S. PATENT DOCUMENTS

2017/0026866 A1* 1/2017 Sandberg ............... H04W 24/08
2017/0317800 A1* 11/2017 Park ....................... H04W 28/04
2021/0153057 A1* 5/2021 Zheng .................... H04W 24/10

\* cited by examiner

INTERFERENCE VARIATION INDICATION

CROSS-REFERENCE TO RELATED APPLICATIONS

The present application claims priority to and the benefit of U.S. Provisional Patent Application No. 62/706,737 filed Sep. 7, 2020 and titled "Interference Variation Indication," the disclosure of which is incorporated by reference herein in its entirety as if fully set forth below in its entirety and for all applicable purposes.

TECHNICAL FIELD

This application relates to wireless communication systems. More particularly, this application relates to methods (and associated devices and systems) for user equipment (UEs) to be configured by base stations (BSs) to identify abrupt changes in interference.

INTRODUCTION

Wireless communications systems are widely deployed to provide various types of communication content such as voice, video, packet data, messaging, broadcast, and so on. These systems may be capable of supporting communication with multiple users by sharing available system resources. A wireless multiple-access communications system may include a number of base stations (BSs), each simultaneously supporting communications for multiple communication devices, which may be otherwise known as user equipment (UE).

A UE being served by the base station may typically send network feedback information to the base station about channel conditions between the UE and the BS. Existing approaches are unable to properly detect and/or convey abrupt changes in interference conditions seen at the UE, which may arise due to circumstances around the UE changing quickly. Moreover, the interference reports sent to the BS only inform the BS of the state of interference during that slot, missing history information that may be predictive of future interference probability.

Thus, there is a need to provide a signaling mechanism that facilitates capturing abrupt changes in interference conditions as well as that provides more history of interference to improve scheduling decisions in view of current and probably future conditions.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a user equipment (UE) from a base station (BS), quantizing information for an interference metric into one of a plurality of interference states. The method further includes tracking, by the UE, the interference metric of a channel condition at the UE. The method further includes determining, by the UE, to send an interference change report in response to a trigger related to the interference metric. The method further includes transmitting, by the UE, the interference change report to the BS in response to the determining.

In an additional aspect of the disclosure, a method of wireless communication includes transmitting, by a base station (BS) to a user equipment (UE), quantizing information for an interference metric into one of a plurality of interference states. The method further includes receiving, by the BS from the UE, an interference change report in response to a trigger related to the interference metric tracked by the UE. The method further includes predicting, by the BS, a future interference condition at the UE based on the received interference change report. The method further includes determining, by the BS, scheduling information based on the future interference condition. The method further includes transmitting, by the BS, the scheduling information to the UE.

In an additional aspect of the disclosure, a user equipment includes a transceiver configured to receive, from a base station (BS), quantizing information for an interference metric into one of a plurality of interference states. The user equipment further includes a processor configured to track, by the UE, the interference metric of a channel condition at the UE, and determine to send an interference change report in response to a trigger related to the interference metric based on the quantizing information. The user equipment further includes wherein the transceiver is further configured to transmit the interference change report to the BS in response to the determining.

In an additional aspect of the disclosure, a base station includes a transceiver configured to transmit, by the base station (BS) to a user equipment (UE), quantizing information for an interference metric into one of a plurality of interference states. The transceiver is further configured to receive, by the BS from the UE, an interference change report in response to a trigger related to the interference metric tracked by the UE. The base station further includes a processor configured to predict a future interference condition at the UE based on the received interference change report, and determine scheduling information based on the future interference condition, wherein the transceiver is further configured to transmit the scheduling information to the UE.

In an additional aspect of the disclosure, a non-transitory computer-readable medium is provided having program code recorded thereon, the program code comprising code for causing a user equipment (UE) to receive, from a base station (BS), quantizing information for an interference metric into one of a plurality of interference states. The program code further comprises code for causing the UE to track the interference metric of a channel condition at the UE. The program code further comprises code for causing the UE to determine to send an interference change report in response to a trigger related to the interference metric. The program code further comprises code for causing the UE to transmit the interference change report to the BS in response to the determination.

In an additional aspect of the disclosure, a non-transitory computer-readable medium is provided having program code recorded thereon, the program code comprising code for causing a base station (BS) to transmit, to a user equipment (UE), quantizing information for an interference metric into one of a plurality of interference states. The program code further comprises code for causing the BS to receive, from the UE, an interference change report in response to a trigger related to the interference metric tracked by the UE. The program code further comprises code for causing the BS to predict a future interference condition at the UE based on the received interference change report. The program code further comprises code for causing the BS to determine scheduling information based on the future interference condition. The program code further comprises code for causing the BS to transmit the scheduling information to the UE.

In an additional aspect of the disclosure, a user equipment includes means for receiving, by the user equipment (UE) from a base station (BS), quantizing information for an interference metric into one of a plurality of interference states. The user equipment further includes means for tracking, by the UE, the interference metric of a channel condition at the UE. The user equipment further includes means for determining to send an interference change report in response to a trigger related to the interference metric based on the quantizing information. The user equipment further includes means for transmitting the interference change report to the BS in response to the determining.

In an additional aspect of the disclosure, a base station includes means for transmitting, by the base station (BS) to a user equipment (UE), quantizing information for an interference metric into one of a plurality of interference states. The base station further includes means for receiving, by the BS from the UE, an interference change report in response to a trigger related to the interference metric tracked by the UE. The base station further includes means for predicting a future interference condition at the UE based on the received interference change report. The base station further includes means for determining scheduling information based on the future interference condition. The base station further includes means for transmitting the scheduling information to the UE.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
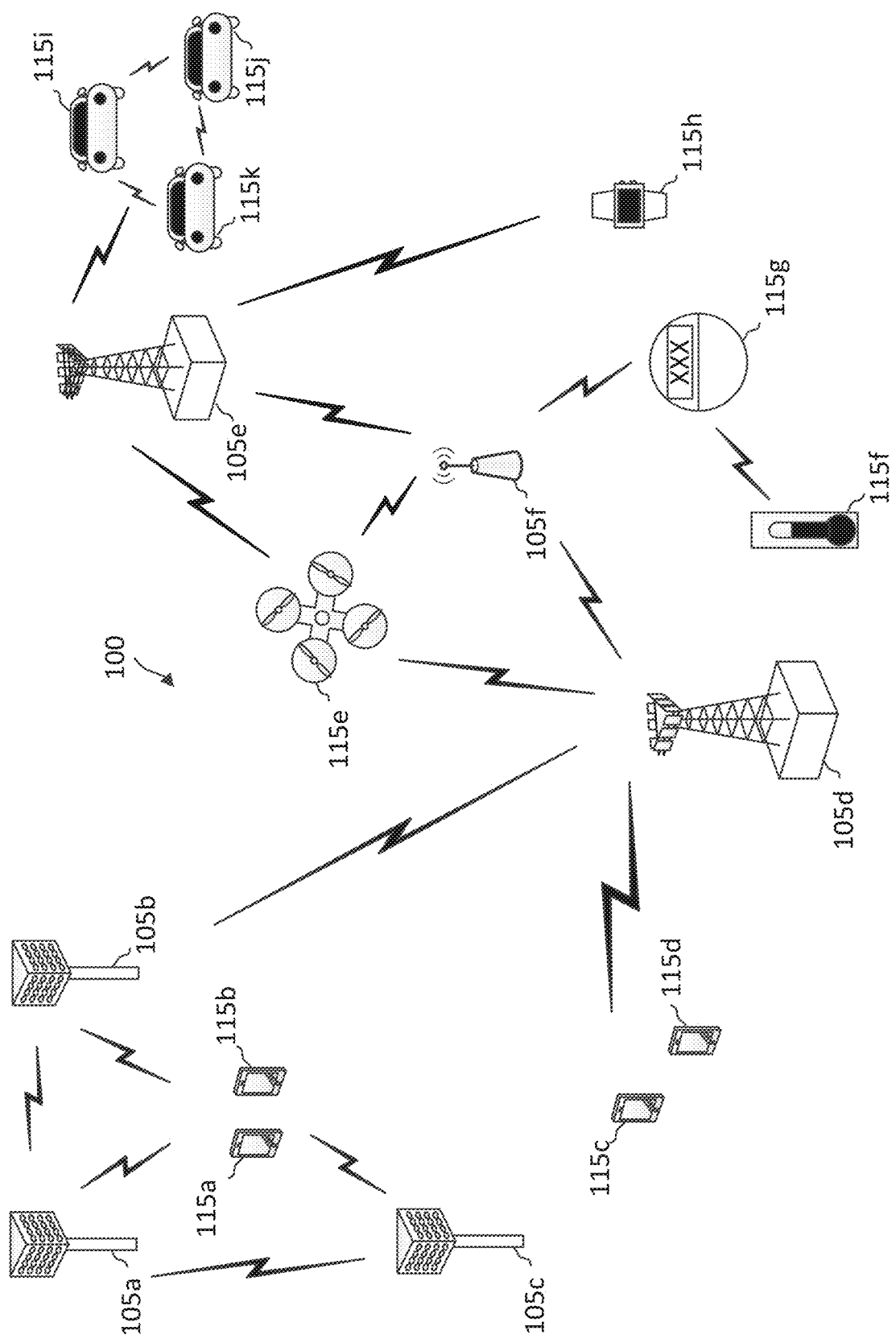
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms to implement methods (and associated devices and systems) for UEs to track interference observed over time and communicate information related to the interference in a manner that captures abrupt changes on demand and/or provides more history of interference for use in scheduling decision. To assist a scheduler at a base station (BS), a UE being served by the base station may typically send network feedback information to the base station about channel conditions between the UE and the BS. This information may include information about interference observed on the downlink (from the perspective of the UE) from one or more other base station transmissions (i.e., base stations that are not currently serving the UE), such as in the form of an interference measurement report. The BS uses this information to make scheduling decisions. However, such approaches are unable to properly detect and/or convey abrupt changes in interference conditions seen at the UE, which may arise due to circumstances around the UE changing quickly. Changes may arise due to, for example, the starting or stopping of an interfering transmission in a neighboring cell due to traffic variations, a neighboring cell's change in scheduling decision, a handover of the UE or of a neighboring UE changing a source of interference, a significant change in the channel between the interferer and the UE, etc.

According to embodiments of the present disclosure, however, when an abrupt change in interference is detected at a UE (such as surpassing a threshold and/or transitioning the UE to a different interference state), this may trigger the UE to dynamically send an interference indication, also referred to herein as an interference change report, to the serving BS. In some examples, the BS may periodically or aperiodically configure the UE with information that allows the UE to quantize the measurements the UE detects into an interference state. The configuration may be achieved through control signaling to the UE, such as RRC messaging and/or MAC-CE messaging and/or DCI messaging. The interference state may be defined based on one or more interference characteristics including interference power, rank, eigen-values, frequency-domain patterns, etc. In particular, the BS may configure the UE with one or more ranges per interference state for the interference characteristics defining the interference states. Alternatively, the UE may be triggered to send an interference change report based on a configured periodicity expiring, and/or in response to the BS dynamically requesting the UE to transmit interference information (including interference history information according to embodiments of the present disclosure).

The interference change report may be a flag or short set of bits that indicates to the BS that a condition has changed, or (if the short set of bits) information used to look up an interference state (with corresponding defined interference metrics/ranges) that identifies relevant interference information. For example, in some embodiments the interference change report may be an index value, also referred to herein as a state index, identifying the interference state that the UE has transitioned into. This may correspond to one of the interference states that were previously configured by the BS. Alternatively or in addition, the interference change report may include information about interference observed at the UE over time (i.e., a history of interference) that the BS may use to determine scheduling information, as opposed to a snapshot in time of interference conditions. Further, the UE may include as part of the interference change report, or as part of a subsequent CQI report, one or more MCS predicted based on historic interference information (and current interference information). For example, the UE may use the interference history (such as one or more of the statistics) over various past time periods to predict channel conditions in the future. The UE may make a first MCS prediction for a short term into the future based on a short period of history of interference values, and a second MCS prediction for a longer term into the future based on a longer period of history of interference values. More MCS over different time periods may be predicted and sent as well.

Aspects of the present application provide several benefits. For example, embodiments of the present disclosure enable a UE to signal large interference variations that would not be captured in a timely manner with existing approaches. This aids in improving short-term throughput guarantees between the BS and UE by reducing fluctuations in the throughput, as well as in improving an overall reliability of the link. Further, embodiments of the present disclosure enable the UE to track interference observed over time and communicate information related to the interference that provides more history of interference for use in scheduling decisions at the BS. This enables the scheduling at the BS to take into account a more accurate history of interference seen at the UE that may be used for future interference prediction(s). Benefits including those noted above may enhance the performance of the links in ultra-reliable, low-latency communication (URLLC) and extended reality (XR) applications that seek consistent (possible, for example, from the interference history included according to embodiments of the present disclosure) and reliable link quality. Additional features and benefits of the present disclosure are set forth in the following description.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information —reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 may perform a random access procedure to establish a connection with the BS 105. In a four-step random access procedure, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response may be referred to as a message 1 (MSG 1), a message 2 (MSG 2), a message 3 (MSG 3), and a message 4 (MSG 4), respectively. According to embodiments of the present disclosure, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (msgA). The combined random access response and connection response in the two-step random access procedure may be referred to as a message B (msgB).

After establishing a connection, the UE 115 and the BS 105 can enter an operational state, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some embodiments, while the UE 115 and the BS 105 are in an operational state, including the UE communicating via UL and DL with the BS 105, interference may arise as seen by the UE 115 in communicating with the BS 105 (illustrated in an example in FIG. 2, discussed further below). For example, one or more UEs 115 in one or more neighboring cells may engage in activity that causes interference as seen by the UE 115 in the operational state with the BS 105. This may include, for example, a UE 115 in a neighboring cell starting or stopping traffic (e.g., in a periodic manner depending on the application, such as buffering and playing content while video streaming as just one example), an abrupt change in scheduling decision by a scheduler of a BS 105 in a neighboring cell (causing a change in the resources used by the interfering transmission), a handover event of the UE 115 in the operational state that may change a source of interference seen by the UE 115, a handover event of a neighboring UE 115 in a neighboring cell that may change a source of interference, and a significant change in the channel between an interfering UE 115 and the UE 115 in the operational state.

According to embodiments of the present disclosure, to assist in tracking, indicating, and managing such types of interference, a BS 105 (whether the one the UE 115 is currently communicating with, a prior BS 105, and/or both, etc.) may configure the UE 115 at some prior point in time with information that allows the UE 115 to quantize measurements that the UE 115 makes of its environment into an interference state. For example, the BS 105 may configure the UE 115 with multiple interference states against which the UE 115 compares tracked interference information. Each interference state may be defined based on one or more interference characteristics including interference power, rank, eigen-values, frequency-domain patterns, etc. The BS 105 may provide the interference characteristics defining the interference states as a range per interference state, thereby to facilitate the UE 115 quantizing its measurements to compare against the ranges of the different interference states.

The BS 105 may configure the UE 115 with this information, or some subset of it (e.g., some of the information provided at different times and/or intervals from the BS 105 or other BS(s) 105), periodically or aperiodically. For example, the BS 105 may in some embodiments send the information at periodic intervals for the UE 115 to implement, whether or not any changes to any of the ranges/values used to quantize the interference states might have occurred. In another example, the BS 105 may in some embodiments send the information when something has changed for one or more of the aspects of the interference states. The configuration may be achieved via RRC signaling and/or MAC-CE signaling and/or DCI signaling. In some examples, the BS 105 may configure the UE 115 with the particular ranges corresponding to the different interference states (and/or a varying number of interference states over time), in a UE-specific manner. That is, the information the BS 105 configures the UE 115 may be specific to the UE 115. In other examples, the information the BS 105 configures the UE 115 with may be applicable to a group of UEs, or applicable to the cell the BS 105 is serving.

With the UE 115 configured with the information to quantize measurements taken, the UE 115 may track interference observed at the UE 115 (also alternatively referred to as a "victim" UE as pertains to interference at the UE) over time and transmit an indication to the BS 105 about a variation of interference at the UE 115. As the UE 115 monitors and measures interference conditions, it may compare the measured interference against the one or more interference characteristics, and quantize the measured interference into one of the interference states. Should the measured interference result in the UE 115 changing interference states, this may serve as a triggering event that results in the UE 115 dynamically communicating an interference change report to the BS 105.

In some embodiments, such an interference change report may be a flag that in turn triggers the BS 105 to request the UE 115 for updated channel information (e.g., in a new interference measurement report). In some other embodiments, the interference change report may include a bit pattern that identifies to the BS 105 what particular interference state the UE 115 has observed movement into. This may identify a corresponding interference state, with known interference parameters (at least ranges), as preconfigured between the BS 105 and UE 115. For example, the UE 115 may transmit as the bit pattern the state index that identifies to the BS 105 the interference state into which the UE 115 has transitioned, such as according to the ranges used to quantize measurements as previously configured by the BS 105. Thus, the UE 115 does not necessarily have to convey the interference information measured at the UE 115, but rather a summarized indication of the interference state observed at the UE 115 which the BS 105 may use to check a look-up table. In some examples, the UE 115 may also or alternatively provide one or more rank values and/or modulation and coding scheme (MCS) to feedback to the BS 105.

According to some additional embodiments of the present disclosure, the UE 115 may signal interference observed over time to provide more history of interference for use in scheduling decisions at the BS 105. This may be signaled independently from, or in conjunction with (such as in support of) the dynamically triggered interference change report transmission due to interference state change. In the alternative embodiments, this may be triggered on a periodic basis that has been scheduled for the UE 115, or alternatively in response to the BS 105 sending a request for the information to the UE 115 (e.g., in downlink control information (DCI)). The interference observed over time may be represented by statistics that the UE 115 sends to the BS 105. The statistics may include the history since a prior report was transmitted to the BS 105, and/or the history over a predetermined number of prior slots, etc. The statistics may include information about a variance of the interference power (such as over a mean interference power), a maximum interference power (e.g., over a past time period), a minimum interference power (e.g., over a past time period), and/or a rank within a determined time window. Other examples include short-term and/or long-term averages of the interference power, statistics about the eigen values of the interference covariance matrix across antennas (for example, the relative ratio of the eigen values), a typical time duration between changes in the interference state determined at the UE 115, and/or a probability of transition between interference states at the UE 115. In some examples, the BS 105 may use this history information to update or modify the information related to the different interference states, including the ranges of values used to quantize measurements the UE 115 takes into one of the different interference states, and/or the number of interference states that exist at a point in time.

As a yet further example of information provided by the UE 115, the UE 115 may include one or multiple predicted MCS for different future time periods for the BS 105 to choose between. For example, the UE 115 may use the interference history (such as one or more of the statistics noted) over various past time periods to predict channel conditions in the future. The UE 115 may make a first MCS prediction for a short term into the future based on a short period of history of interference values, and a second MCS prediction for a longer term into the future based on a longer period of history of interference values. For example, if the history demonstrates a more stable record of interference seen at the UE 115, the predicted future MCS may be more aggressive in terms of resources suggested, while if the history demonstrates a larger variability the predicted future MCS may be more conservative in terms of resources suggested. More MCS over different time periods may be predicted and sent as well.

As a result, embodiments of the present disclosure enable a UE 115 to signal large interference variations that would not be captured in a timely manner with existing approaches. This aids in improving short-term throughput guarantees between the BS 105 and UE 115, as well as in improving an overall reliability of the link between the BS 105 and the UE 115. Further, embodiments of the present disclosure further enable UE 115 to track interference observed over time and communicate information related to the interference that provides more history of interference for use in scheduling decisions at the BS 105 for the UE 115. This enables the scheduling at the BS 105 to take into account a more accurate history of interference seen at the UE 115 that may be used for future interference prediction(s). Benefits including those noted above may enhance the performance of the links in ultra-reliable, low-latency communication (URLLC) and extended reality (XR) applications that seek consistent (possible, for example, from the interference history included according to embodiments of the present disclosure) and reliable link quality.

The network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP).

Figure 2:
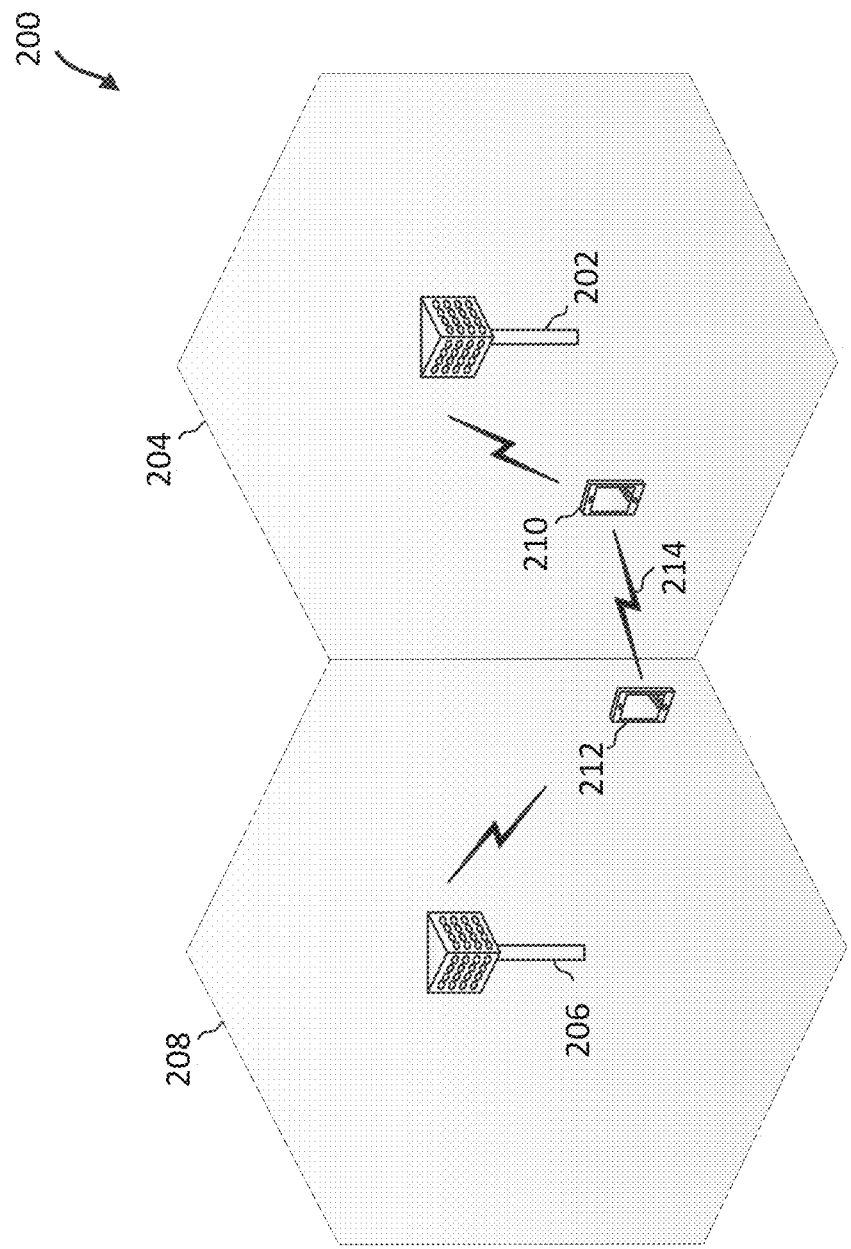
FIG. 2 illustrates a wireless communication network according to some embodiments of the present disclosure.

FIG. 2 illustrates a wireless communication network according to some embodiments of the present disclosure, in particular an example of conditions that may cause interference to arise as seen by a UE. As illustrated, a wireless communication network 200 (an example of the network 100 illustrated in FIG. 1) includes a BS 202 with corresponding cell 204 and BS 206 with corresponding cell 208. These are examples of one or more types of BS 105 illustrated in FIG. 1. Likewise, UEs 210 and 212 are examples of one or more types of UEs 115 illustrated in FIG. 1. Just a few are illustrated in FIG. 2 for simplicity in illustration and discussion of principles herein.

The BS 202 may be in communication with UE 210 in cell 204, and BS 206 in communication with UE 212 within cell 208. In the illustrated example, UE 212 causes interference 214 as seen by the UE 210, i.e. a victim UE. The cause of the interference may be one or many, such as the UE 212 engaging in activity that causes interference 214 as seen by the UE 210 in the operational state with the BS 202. This may include, for example, the UE 212 in neighboring cell 208 starting or stopping traffic (e.g., in a periodic manner depending on the application, such as buffering and playing content while video streaming as just one example), an abrupt change in scheduling decision by a scheduler of the BS 206 in the neighboring cell 208 (causing a change in the resources used by the interfering transmission), a handover event of the UE 210 in the operational state (e.g., from cell 208 to cell 204 to name one illustrative example) that may change a source of interference seen by the UE 210, a handover event of the neighboring UE 212 in the neighboring cell 208 that may change a source of interference, and a significant change in the channel (e.g., interference 214) between the interfering UE 2122 and the UE 210 in the operational state.

These are just some examples of how the UE 210, in the example where the UE 210 is a victim UE subject to interference, may encounter interference from another source. As the UE 210 (as an example) monitors interference, it may keep track by using interference states to both analyze and communicate interference information to the BS 202 (as the example BS serving the UE monitoring/measuring/reporting interference). These interference states, including the number of interference states and/or the ranges for the one or more interference characteristics (such as interference power, rank, eigen-values, frequency-domain patterns, etc.), may have been configured by the BS 202 (and/or other BS(s) that serve or served the UE 210) at some point in the past according to a periodic and/or aperiodic control messaging.

Figure 3:
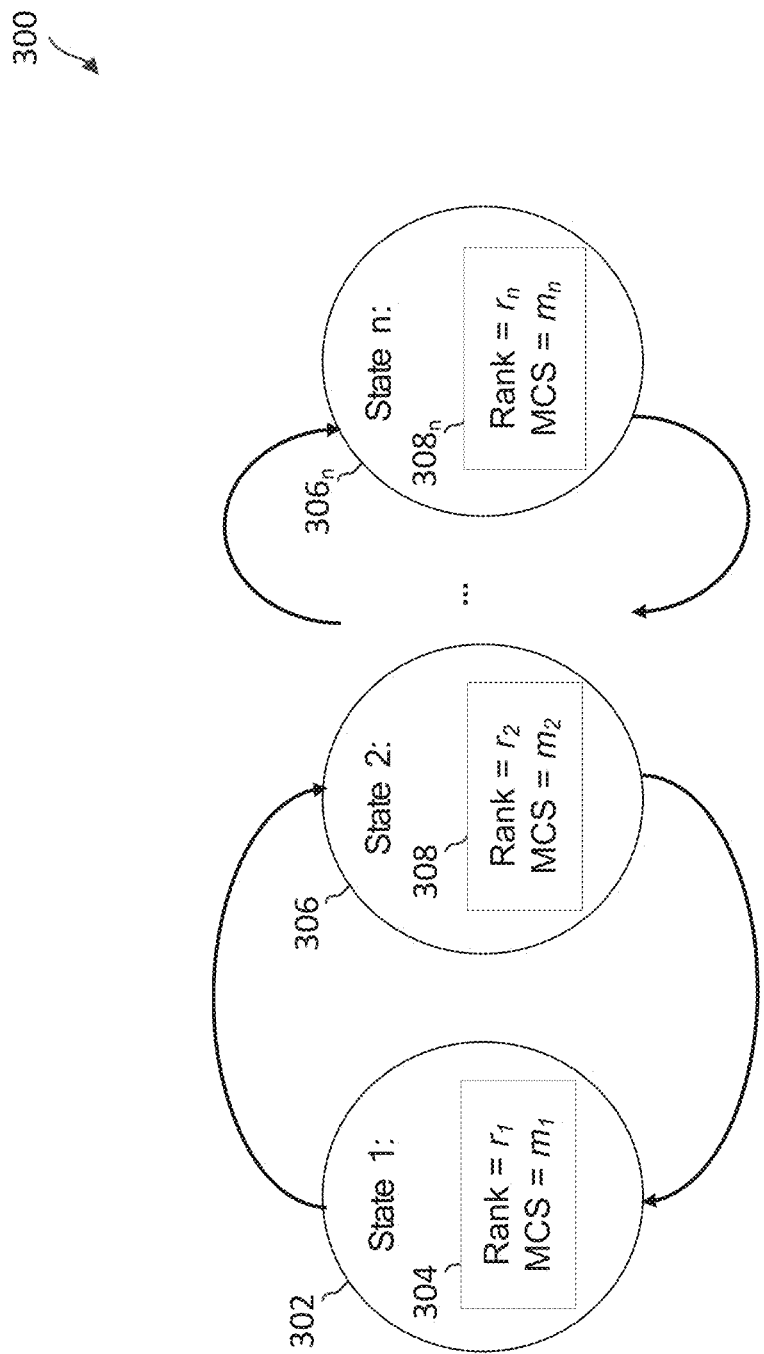
FIG. 3 illustrates transitions between interference states according to some embodiments of the present disclosure.

This aspect relating to using interference states to keep track is illustrated in FIG. 3, which shows transitions 300 between interference states according to some embodiments of the present disclosure. As noted previously, the interference a UE 115 sees as a victim UE may be described as being in one of several interference states (which may have been configured by a serving BS previously). FIG. 3 illustrates exemplary interference state 302, interference state 306, and interference state $306_n$. This is to illustrate that there may be any number of interference states configured, such as at a UE 115. In some examples, the number of interference states may be limited to a smaller amount so as to facilitate signaling information regarding interference state with a smaller amount of required bits. However, in other examples there may be many interference states, either that may still be signaled to the BS 105 or that are used internally to the UE 115 without signaling to the BS 105.

Each interference state may include information that defines that state. This information is illustrated as information 304 for interference state 302, information 308 for interference state 306, and information $308_n$ for interference state $306_n$. That information may be one or more interference characteristics, such as interference power, interference power over thermal noise (IOT, a measure of total interference and noise power over noise power), direction of interference (e.g., as appears in the eigen-values of an interference covariance matrix), rank (of transmission), frequency-domain pattern (e.g., which resource blocks from an entire system bandwidth are interfered), etc. Further, the UE 115 may identify a different rank and MCS to feed back to the BS 105 (e.g., in a CQI report). This is illustrated as the rank $r_1$ and MCS $m_1$ in information 304, rank $r_2$ and MCS $m_2$ in information 308, and rank $r_n$ and MCS $m_n$ in information $308_n$. The one or more interference characteristics that define the interference state may be defined by a range, and/or a combination of ranges (e.g., of multiple interference characteristics in combination, and/or with different interference characteristics receiving different weights to contribute to a combined determination of interference state, etc.). Such information may have been configured by a serving BS 105 previously according to a period or aperiodic basis, such as using RRC and/or MAC-CE messaging and/or DCI messaging.

For example, the UE 115 may be in interference state 302, such as based on one or more interference values measured by/at the UE 115 placing the interference within the range(s) defined for interference state 302. In the event that one or more interference characteristics change sufficiently that the UE 115's state no longer meets the defined range(s) for interference state 302, the state may transition to another interference state, such as interference state 306. For example, interference at a UE 115 may come from two different neighbor cells and may have different characteristics, and depend upon which neighbor cell is active (thus resulting in transitioning between states in some examples). In some embodiments, the UE 115 may transition to sequential states, while in other embodiments the UE 115 may transition to other interference states that are not necessarily contiguous to the current interference state. Thus, transitions between any one interference state to any other state may occur.

This transitioning may be used, for example, as a trigger (or part of a trigger) that the UE 115 uses to identify any abrupt changes in interference conditions at the UE 115, which may then transmit some form of information to the BS 105 for more responsive treatment of the interference seen at the UE 115. That information may be sent, in some examples, in the form of a state index that identifies to the BS 105 the interference state into which the UE 115 has transitioned, such as according to the ranges used to quantize measurements as previously configured by the BS 105.

Figure 4:
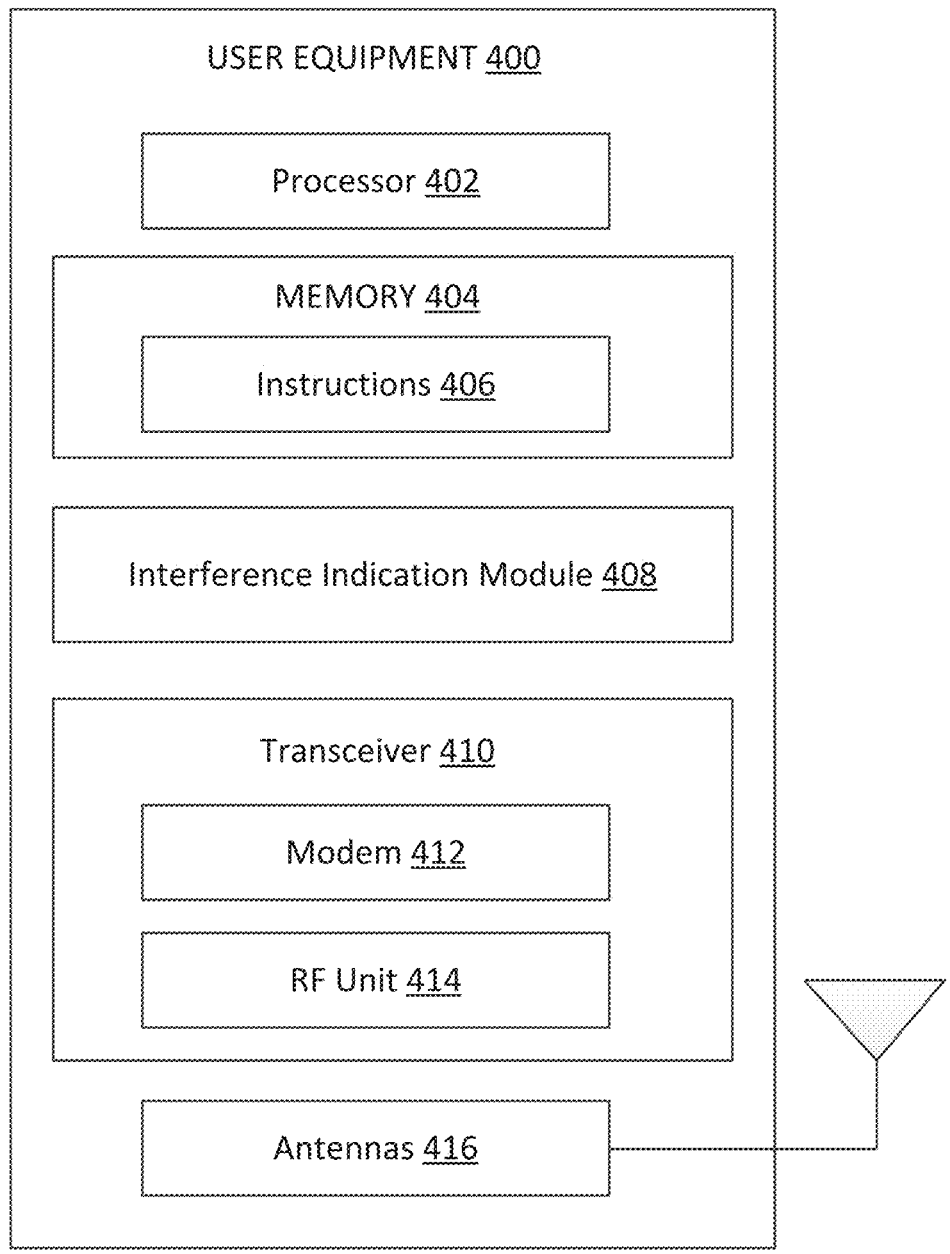
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 discussed above in FIGS. 1-3. As shown, the UE 400 may include a processor 402, a memory 404, an interference indication module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with embodiments of the present disclosure, for example, aspects of FIGS. 1-3 and 6-8. Instructions 406 may also be referred to as program code. The program code may be for causing a wireless communication device (or specific component(s) of the wireless communication device) to perform these operations, for example by causing one or more processors (such as processor 402) to control or command the wireless communication device (or specific component(s) of the wireless communication device) to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The interference indication module 408 may be implemented via hardware, software, or combinations thereof. For example, interference indication module 408 may be implemented as a processor, circuit, and/or instructions 406 stored in the memory 404 and executed by the processor 402. In some examples, the interference indication module 408 can be integrated within the modem subsystem 412. For example, the RACH processing and control module 408 can be implemented by a combination of software components (e.g., executed by a DSP or a general processor) and hardware components (e.g., logic gates and circuitry) within the modem subsystem 412.

The interference indication module 408 may be used for various aspects of the present disclosure, for example, aspects of FIGS. 1-3 and 6-8. The interference indication module 408 is configured to communicate with other components of the UE 400 to measure interference measured at the UE 400 (or, alternatively, process measured interference provided to the interference indication module 408), analyze one or more aspects of the interference including tracking the interference state as illustrated with respect to FIG. 3 above, determine one or more values that represent or reflect a history of interference seen at the UE 400, transmit one or more interference change reports, receive updated scheduling information that takes the updated interference history into account, determine whether a timer has expired, start a timer, cancel a timer, stop a timer, determine whether a transmission counter has reached a threshold, reset a transmission counter, restart a random access procedure, trigger RLF, and/or perform other functionalities related to the interference change report procedures described in the present disclosure.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the interference indication module 408 according to a modulation and coding scheme (MCS) (e.g., a low-density parity check (LDPC) coding scheme, a turbo coding scheme, a convolutional coding scheme, a digital beamforming scheme, etc.). The RF unit 414 may be configured to process (e.g., perform analog to digital conversion or digital to analog conversion, etc.) modulated/encoded data (e.g., UL data bursts, interference indications, RRC messages, RACH message(s), ACK/NACKs for DL data bursts, scheduling data) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 400 to enable the UE 400 to communicate with other devices.

The RF unit 414 may provide the modulated and/or processed data (e.g., data packets or, more generally, data messages that may contain one or more data packets and other information) to the antennas 416 for transmission to one or more other devices. The antennas 416 may further receive data messages transmitted from other devices (such as provided from a BS 105 with information used to quantize the measurements the UE 400 takes into interference states). The antennas 416 may provide the received data messages for processing and/or demodulation at the transceiver 410. The transceiver 410 may provide the demodulated and decoded data (e.g., DL/UL scheduling grants, requests for reports such as CQIs, DL data bursts, RRC messages) to the interference indication module 408 for processing. The antennas 416 may include multiple antennas of similar or different designs in order to sustain multiple transmission links. The RF unit 414 may configure the antennas 416.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement different RATs.

Figure 5:
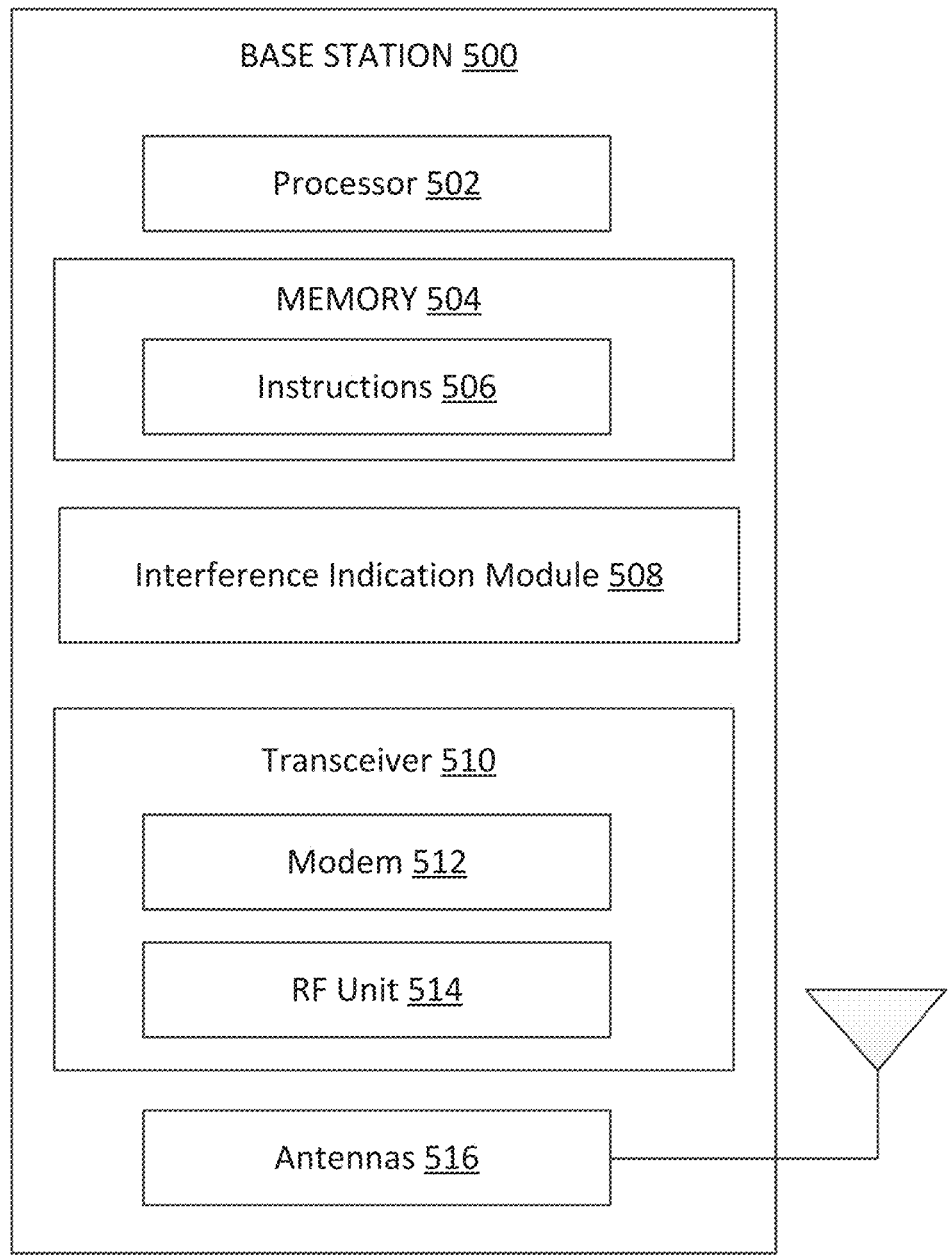
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 as discussed above in FIGS. 1 and 2. As shown, the BS 500 may include a processor 502, a memory 504, interference indication module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-3 and 6-8. Instructions 506 may also be referred to as code, which may be interpreted broadly to include any type of computer-readable statement(s) as discussed above with respect to FIG. 4.

The interference indication module 508 may be implemented via hardware, software, or combinations thereof. For example, the interference indication module 508 may be implemented as a processor, circuit, and/or instructions 506 stored in the memory 504 and executed by the processor 502. In some examples, the interference indication module 508 can be integrated within the modem subsystem 512. For example, the interference indication module 508 can be implemented by a combination of software components (e.g., executed by a DSP or a general processor) and hardware components (e.g., logic gates and circuitry) within the modem subsystem 512.

The interference indication module 508 may be used for various aspects of the present disclosure, for example, aspects of FIGS. 1-3 and 6-8. The interference indication module 508 is configured to determine and/or cause the BS 500 to transmit to a UE information the UE may use to quantize measurements the UE takes into interference states, receive interference change reports from the UE, lookup interference states as signaled by a UE (where included, such as a state index etc.), transmit interference report requests to a UE, transmit one or more DL scheduling grants to a UE indicating DL resources (e.g., time-frequency resources), transmit DL data to the UE, transmit one or more UL scheduling grants to the UE indicating UL resources (e.g., that takes into account updated and/or historical interference information as seen at a UE), receive UL data from the UE, etc.

The interference indication module 508 is configured to communicate with other components of the BS 500 to receive information such as discussed above including interference characteristics, interference states based on those characteristics, changes to those characteristics (e.g., changes to ranges used to define one or more of the interference states, interference change reports from a UE, lookup interference states as signaled by a UE (where included), determine whether a timer has expired, start a timer, cancel a timer, determine whether a transmission counter has reached a threshold, reset a transmission counter, terminate a random access procedure, and/or perform other functionalities related to the interference signaling embodiments of a BS described in the present disclosure.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS (e.g., a LDPC coding scheme, a turbo coding scheme, a convolutional coding scheme, a digital beamforming scheme, etc.). The RF unit 514 may be configured to process (e.g., perform analog to digital conversion or digital to analog conversion, etc.) modulated/encoded data (e.g., requests for interference reports, ACK/NACK requests, DL/UL scheduling grants, DL data, RRC messages, etc.) from the modem subsystem 512 (on outbound transmissions) or of transmissions originating from another source, such as a UE 115 or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 500 to enable the BS 500 to communicate with other devices.

The RF unit 514 may provide the modulated and/or processed data, (e.g., data packets or, more generally, data messages that may contain one or more data packets and other information, and/or control message packets such as RRC or MAC-CE or DCI packets that configure the UE 115 or 400 with the information to quantize measurements into interference states) to the antennas 516 for transmission to one or more other devices. This may include, for example, transmission of information to complete attachment to a network and communication with a camped UE 115 or 400 according to embodiments of the present disclosure. The antennas 516 may further receive data messages transmitted from other devices and provide the received data messages for processing and/or demodulation at the transceiver 510. The transceiver 510 may provide the demodulated and decoded data (e.g., interference change reports, CQI reports, UL data, ACK/NACKs for DL data, etc.) to the interference indication module 508 for processing. The antennas 516 may include multiple antennas of similar or different designs in order to sustain multiple transmission links.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement different RATs.

Figure 6:
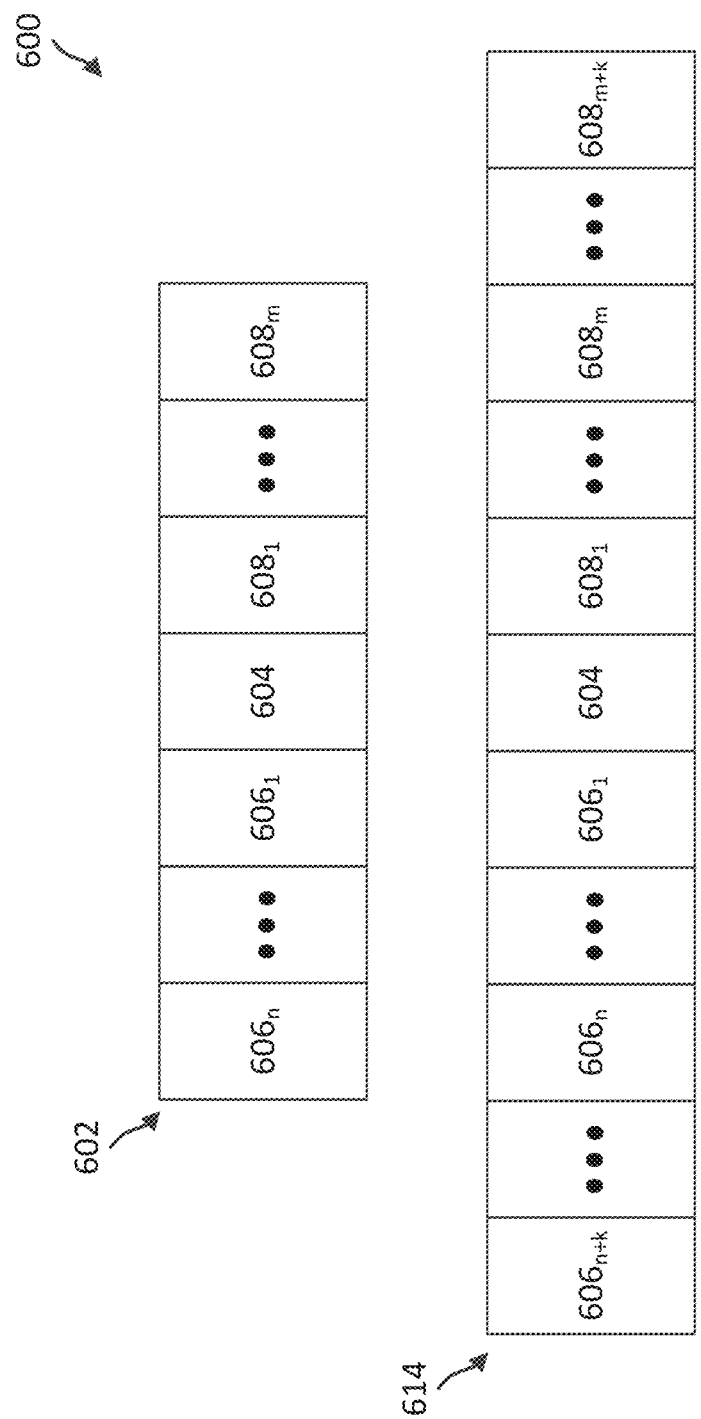
FIG. 6 illustrates a timing diagram according to some embodiments of the present disclosure.

FIG. 6 illustrates a timing diagram in accordance with the present disclosure. For example, FIG. 6 illustrates a combination of a current time slot, a number of prior time slots (for a history of interference conditions seen at a UE), and a number of future time slots (for predictions of interference conditions at the UE). In FIG. 6, a short history diagram 602 is illustrated, followed by a longer history diagram 614.

With respect to the short history diagram 602, the current time slot is illustrated as slot 604. This is the slot in which a UE 115 is currently measuring interference that it sees. In the left direction from slot 604, slots 606 extend into the past, starting with slot $606_1$ that is most recent to the current slot 604, and extending further into the past to slot $606_n$, which may be a relatively small number of slots or more, depending on the desired configuration. In the right direction from slot 604, slots 608 extend into the future, starting with slot $608_1$ that is nearest to the current slot 604 for which the UE 115 is scheduled for communication (i.e., need not be contiguous in time), and extending further into the future to slot $608_m$. In some embodiments, the number of slots $606_n$ may correspond (e.g., equal or have a defined relationship with) the number of slots $608_m$. This may be useful, for example, in using historical interference information in predicting the likelihood of a given interference state into a related time period in the future.

With respect to the longer history diagram 614, as illustrated it includes the slots 604, 606, and 608 as described above, and also includes more history to be used to aid in predicting more slots into the future. This is illustrated respectively as the slot $608_{n+k}$ extending k slots further into the past, and as the slot $608_{m+k}$ extending k slots into the future (while illustrated as extending as many slots into the future as into the past, these values may alternatively be different from each other albeit with a known correspondence between historical information and its use in predicting potential future interference states). In some examples, the short history diagram 602 illustrates the use of a shorter history to predict the probability of a given interference state a short period of time into the future, and the longer history diagram 614 illustrates the use of a longer history to predict the probability of a given interference state a longer period of time into the future.

Figure 7:
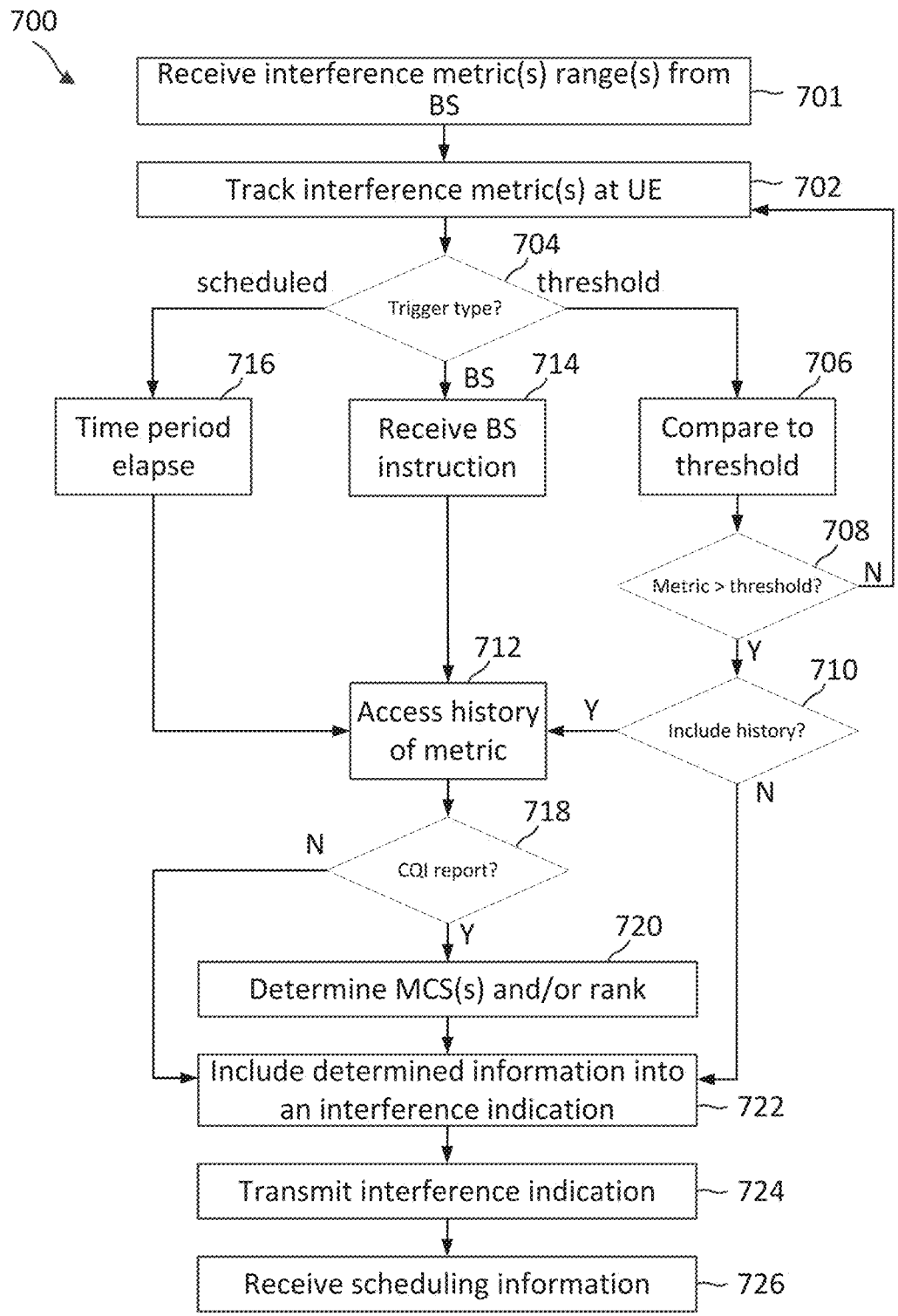
FIG. 7 illustrates a flow diagram of a wireless communication method according to some embodiments of the present disclosure.

FIG. 7 illustrates a flow diagram of a wireless communication method 700 for tracking interference observed over time and communicating information related to the interference, according to some embodiments of the present disclosure. Aspects of the method 700 can be executed by a wireless communication device, such as the UEs 115 and/or 400 utilizing one or more components, such as the processor 402, the memory 404, the interference indication module 408, the transceiver 410, the modem 412, the one or more antennas 416, and various combinations thereof. As illustrated, the method 700 includes a number of enumerated steps, but embodiments of the method 700 may include additional steps before, during, after, and in between the enumerated steps. Further, in some embodiments, one or more of the enumerated steps may be omitted or performed in a different order.

At block 701, the UE 115 receives from the BS 105 definitions of one or more interference metrics, including for example ranges of the one or more interference metrics for the UE 115 to use in quantizing the measurements it takes into one of several interference states tracked by the UE 115. For example, the UE 115 may receive one or more thresholds for the metrics, such as ranges for the metrics for corresponding interference states. This may also include receiving from the BS 105 an identification of how many interference states are configured or reconfigured at the UE 115. While illustrated at occurring at the start of method 700, the UE 115 may receive such configuration information, or some subset thereof, periodically or aperiodically from the BS 105 (e.g., referring to the same or different BS(s) over time).

At block 702, the UE 115 tracks one or more interference metrics as seen by the UE 115. This may include, for example, interference power, interference power over thermal noise (JOT, a measure of total interference and noise power over noise power), direction of interference (e.g., as appears in the eigen-values of an interference covariance matrix), rank (of transmission), frequency-domain pattern (e.g., which resource blocks from an entire system bandwidth are interfered), etc.

At decision block 704, if the trigger type for sending an interference change report to BS 105 is based on a threshold being surpassed, the method 700 proceeds to block 706.

At block 706, the UE 115 compares the tracked interference metric(s) from block 702 to the threshold. This may include, for example, comparing the metric(s) to one or more ranges (such as configured from the BS 105 at block 701) for corresponding interference states to identify either that the UE 115 should no longer be in its current state, or to identify the new state that the UE 115 should be in.

At decision block 708, if the tracked interference metric(s) does not exceed the threshold (such as a single value or a range/multiple ranges, etc.), then the method 700 returns to block 702 and repeats. If, instead, the threshold is exceeded, then the method 700 proceeds to decision block 710 (as part of a procedure to provide an interference change report to BS 105).

At decision block 710, if the UE 115 is to include interference history, such as statistics, the method proceeds to block 712.

At block 712, the UE 115 accesses historic information of the tracked interference metric(s) for analysis and/or inclusion into the interference change report being prepared. Statistics may include one or more of information about a variance of the interference power (such as over a mean interference power), a maximum interference power (such as over a past time period), a minimum interference power (such as over a past time period), and/or a rank within a determined time window. Other examples include short-term and/or long-term averages of the interference power, a typical time duration between changes in the interference state determined at the UE 115, and/or a probability of transition between interference states at the UE 115.

Returning to decision block 710, if history is not to be included, then the method 700 may proceed to block 722, which will be discussed in further detail below.

Returning to decision block 704, if the trigger type is instead BS-based, then the method 700 proceeds to block 714.

At block 714, the UE 115 receives an instruction from the BS 105 that triggers the UE 115 to prepare and send an interference change report. This may be, for example, a request sent in a DCI from the BS 105 such that the UE 115 is dynamically triggered thereby. The method 700 proceeds from block 714 to 712, and from there as described further below.

Returning again to decision block 710, if the trigger is instead based on a configured periodicity (i.e., scheduled), the method 700 proceeds to block 716.

At block 716, the UE 115 allows the configured time period to elapse. The expiration of the time period triggers the method 700 to proceed with preparing and sending an interference change report. This may repeat again each time that the configured time period elapses. The method 700 proceeds from block 716 to 712, and from there as described further below.

Turning now to block 712 again, once the UE 115 has accessed the historic information, the method 700 proceeds to decision block 718.

At decision block 718, if the UE 115 is to prepare a CQI report, such as for example in response to a request from the BS 105 or because it is configured to do so as part of an interference indication procedure, the method 700 proceeds to block 720.

At block 720, the UE 115 determines one or more MCS and/or rank values to recommend for a future time period to the BS 105 based on the interference metric(s) and history of those metrics at the UE 115. For example, where one MCS is determined, a shorter time period such as illustrated by the short history diagram 602 may be used (though longer time periods may be used as well for the MCS recommendation). As another example, where multiple MCS are determined, one may correspond to a shorter historic time period (e.g., short history diagram 602), and another MCS may correspond to a longer historic time period (e.g., the longer history diagram 614). This concept applies similarly to rank (e.g., with respect to short and long periods).

For example, the UE 115 may predict the MCS for different future time windows based on corresponding historic windows. As one example, if the UE 115 is scheduled to transmit in a slot in the near future (e.g., one slot), then a first MCS may be recommended to the BS 105. This first MCS may be based on a short term historic average of interference values, used to predict the interference into the short term future. This may be used to predict SINR. If the UE is alternatively or also scheduled to transmit in a slot further into the future, then a second MCS may be recommended to the BS 105. This second MCS may be based on a longer-term historic average of interference values that is used to predict interference into the longer-term future. For example, the shorter-term MCS may be more aggressive, while the longer-term MCS may reflect a more conservative estimation given the greater uncertainty further in the future. While just two MCS are given as examples, any number of MCS may be determined for varying future time periods.

The method 700 proceeds from block 720 to block 722. Further, returning to decision block 718, if the UE 115 is not to prepare a CQI report, the method 700 proceeds to block 722.

At block 722, the UE 115 includes the determined interference information (e.g., from blocks 706, 718, or 720) into an interference change report. This may include a flag, where the indication is intended to alert the BS 105 to request a report from the UE 115, or more information such as a bit pattern to indicate an interference state (e.g., including a state index in some examples), to yet further information to signal aspects of historic interference information, such as summarized by one or more statistics.

At block 724, the UE 115 transmits the interference change report to the BS 105.

At block 726, the UE 115 receives scheduling information from the BS 105 that is based on the interference change report previously received. In some embodiments, this may be based on information included in the interference change report itself, while in other embodiments this may be based on the interference change report triggering the BS 105 to request a report from the UE 115, which the BS 105 then uses for the updated scheduling information that the UE 115 receives at step 726.

Figure 8:
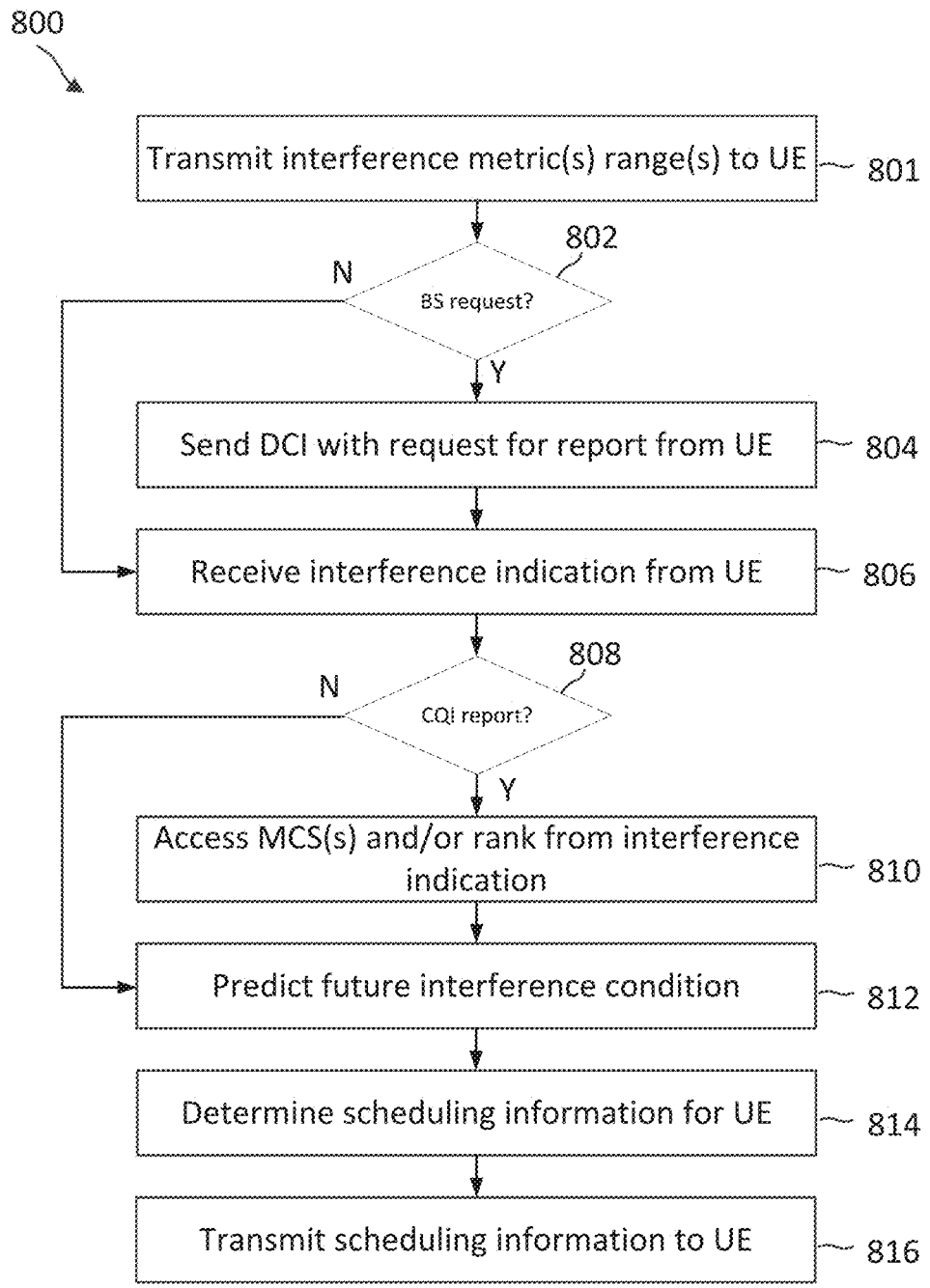
FIG. 8 illustrates a flow diagram of a wireless communication method according to some embodiments of the present disclosure.

FIG. 8 illustrates a flow diagram of a wireless communication method 800 for tracking interference observed over time and communicating information related to the interference, according to some embodiments of the present disclosure. Aspects of the method 800 can be executed by a wireless communication device, such as the BSs 105 and/or 500 utilizing one or more components, such as the processor 502, the memory 504, the interference indication module 508, the transceiver 510, the modem 512, the one or more antennas 516, and various combinations thereof. As illustrated, the method 800 includes a number of enumerated steps, but embodiments of the method 800 may include additional steps before, after, and in between the enumerated steps. In some embodiments, one or more of the enumerated steps may be omitted or performed in a different order.

At block 801, the BS 105 sends to the UE 115 definitions of one or more interference metrics, including for example ranges of the one or more interference metrics for the UE 115 to use in quantizing the measurements it takes into one of several interference states tracked by the UE 115. For example, the BS 105 may transmit one or more thresholds for the metrics, such as ranges for the metrics for corresponding interference states. This may also include transmitting an identification of how many interference states are configured or reconfigured at the UE 115. While illustrated at occurring at the start of method 800, the BS 105 may determine to transmit such configuration information, or some subset thereof, periodically or aperiodically.

At decision block 802, if the BS 105 requests the UE 115 to send an interference change report, the method 800 proceeds to block 804. This may correspond, for example, to the branch from decision block 704 where the trigger type is BS-based.

At block 804, the BS 105 sends a DCI in a DL message to the UE 115 with a request for an interference report from the UE 115. This triggers the UE 115 to prepare and send an interference change report. The method 800 then proceeds to block 806, as will be discussed further below.

Returning to decision block 802, if the BS 105 does not request the UE 115 to send an interference change report, the method 800 proceeds instead to block 806.

At block 806, the BS 105 receives an interference change report from the UE 115. When the method 800 proceeds from block 804, this interference change report is in response to the BS 105 requesting an interference report from the UE 115, and may include historic interference information (or statistics based on that information) such as has been discussed above (e.g., with respect to block 712). In other examples, such as where the method 800 proceeds from decision block 802, the interference change report may be a flag or short set of bits that indicates an interference state or dynamically-triggered indication due to one or more interference metrics exceeding threshold(s). The short set of bits may be, in some examples, a state index that identifies the state by the UE 115.

At decision block 808, if the BS 105 receives one or more MCS from the UE 115 as part of the interference change report (e.g., where the interference change report includes a CQI report with one or more MCS predicted), the method 800 proceeds to block 810.

At block 810, the BS 105 accesses the MCS (or multiple MCS, where included) from the interference change report. The method 800 then proceeds to block 812.

Returning to decision block 808, if the BS 105 does not receive an MCS from the UE 115 as part of the interference change report, then the method 800 proceeds instead to block 812.

At block 812, the BS 105 predicts a future interference condition expected to be seen at the UE 115. For example, where the method 800 includes MCS from the UE 115, the BS 105 may take the MCS received. As another example, the BS 105 may make the prediction based on a history of interference information included as part of the interference change report, and/or based on signaling that identifies an interference state that the UE 115 is now in (and a history of states, and/or of when the last transition occurred, etc.).

At block 814, the BS 105 determines scheduling information for the UE 115 based on the predicted future interference condition(s) (e.g., for one future time period or for multiple time periods).

At block 816, the BS 105 transmits the determined scheduling information to the UE 115 for the UE 115 to implement to address current or predicted interference states. The scheduling information is, therefore, based on information included in the interference change report received at block 806.

Further aspects of the present disclosure include the following:

1. A method comprising:
   receiving, by a user equipment (UE) from a base station (BS), quantizing information for an interference metric into one of a plurality of interference states;
   tracking, by the UE, the interference metric of a channel condition at the UE;
   determining, by the UE, to send an interference change report in response to a trigger related to the interference metric based on the quantizing information; and
   transmitting, by the UE, the interference change report to the BS in response to the determining.

2. The method of aspect 1, further comprising:
   receiving, at the UE from the BS, scheduling information for the UE based on the interference change report.

3. The method of any of aspects 1-2, wherein the receiving further comprises receiving a radio resource control (RRC) message, medium access control control element (MAC-CE), or downlink control information (DCI) message comprising the quantizing information.

4. The method of any of claims 1-3, wherein the quantizing information comprises a threshold, further comprising:
   triggering, by the UE, the determining in response to the interference metric passing the threshold;
   identifying, by the UE, a transition from a first interference state from among the plurality of interference states to a second interference state from among the plurality of interference states based on a change to the interference metric; and
   encoding, by the UE prior to the transmitting, a representation of the second interference state into the interference change report.

5. The method of any of aspects 1-4, further comprising:
   encoding, by the UE prior to the transmitting, a current state index identifying an interference state from among the plurality of interference states, at a point in time that the trigger occurs, into the interference change report.

6. The method of any of aspects 1-5, wherein the determining further comprises:
   identifying, by the UE, a statistic based on a history of interference at the UE related to the interference metric before a current time slot; and
   determining, by the UE based on the statistic, a predicted modulation and coding scheme (MCS) to include with the interference change report for consideration by the BS for a future time period.

7. The method of aspect 6, wherein the predicted MCS comprises a first predicted MCS and the future time period comprises a first future time period, the method further comprising:
   determining, by the UE based on the statistic, a second predicted MCS to include with the interference change report for consideration by the BS, the second predicted MCS corresponding to a second future time period, the second future time period being after the first future time period.

8. The method of any of aspects 6-7, wherein the statistic comprises at least one of a variance of interference power at the UE, a maximum of interference power at the UE over a past time period, a minimum of interference power at the UE over the past time period, a rank, a probability of interference change at the UE, a first average of interference over a first past time period, a second average of interference over a second time period that is greater than the first past time period, a calculated time duration between interference states at the UE, and relative ratios of eigen values of an interference covariance matrix across antennas.

9. A method comprising:
transmitting, by a base station (BS) to a user equipment (UE), quantizing information for an interference metric into one of a plurality of interference states;
receiving, by the BS from the UE, an interference change report in response to a trigger related to the interference metric tracked by the UE;
predicting, by the BS, a future interference condition at the UE based on the received interference change report;
determining, by the BS, scheduling information based on the future interference condition; and transmitting, by the BS, the scheduling information to the UE.

10. The method of aspect 9, wherein the transmitting the quantizing information further comprises transmitting a radio resource control (RRC) message, medium access control control element (MAC-CE), or downlink control information (DCI) message comprising the quantizing information.

11. The method of any of aspects 9-10, wherein the quantizing information comprises a threshold, and wherein the receiving is based on the interference metric passing the threshold, further comprising:
accessing, by the BS in the interference change report, a representation of an interference state from among the plurality of interference states that the UE has transitioned to from a prior interference state from among the plurality of interference states.

12. The method of any of aspects 9-11, further comprising:
accessing, by the BS in the interference change report, a current state index identifying an interference state from among the plurality of interference states, at a point in time that the trigger occurs.

13. The method of any of aspects 9-11, wherein the interference change report comprises a statistic based on a history of interference at the UE related to the interference metric before a current time slot, further comprising:
accessing, by the BS, a predicted modulation and coding scheme (MCS) included by the UE in the interference change report, the predicted MCS corresponding to a future time period, wherein the determining the scheduling information is based on the predicted MCS.

14. The method of aspect 13, wherein the predicted MCS comprises a first predicted MCS and the future time period comprises a first future time period, the method further comprising:
accessing, by the BS, a second predicted MCS included by the UE in the interference change report, the second predicted MCS corresponding to a second future time period, the second future time period being after the first future time period.

15. The method of any of aspects 13-14, wherein the statistic comprises at least one of a variance of interference power at the UE, a maximum of interference power at the UE over a past time period, a minimum of interference power at the UE over the past time period, a rank, a probability of interference change at the UE, a first average of interference over a first past time period, a second average of interference over a second time period that is greater than the first past time period, a calculated time duration between interference states at the UE, and relative ratios of eigen values of an interference covariance matrix across antennas.

16. A user equipment comprising:
a transceiver configured to receive, from a base station (BS), quantizing information for an interference metric into one of a plurality of interference states; and
a processor configured to:
track, by the user equipment (UE), the interference metric of a channel condition at the UE; and
determine to send an interference change report in response to a trigger related to the interference metric based on the quantizing information; and
wherein the transceiver configured to transmit the interference change report to the BS in response to the determination.

17. The user equipment of aspect 16, wherein the transceiver is further configured to:
receive, from the BS, scheduling information for the UE based on the interference change report.

18. The user equipment of any of aspects 16-17, wherein the transceiver is further configured to receive the quantizing information in a radio resource control (RRC) message, medium access control control ement (MAC-CE), or downlink control information (DCI) message.

19. The user equipment of any of aspects 16-18, wherein the quantizing information comprises a threshold, the processor further configured to:
trigger the determination in response to the interference metric passing the threshold;
identify a transition from a first interference state from among the plurality of interference states to a second interference state from among the plurality of interference states based on a change to the interference metric; and
encode, prior to the transmission, a representation of the second interference state into the interference change report.

20. The user equipment of any of aspects 16-19, wherein the processor is further configured to:
encode, prior to the transmission, a current state index identifying an interference state from among the plurality of interference states, at a point in time that the trigger occurs, into the interference change report.

21. The user equipment of any of aspects 16-19, wherein the processor is further configured to:
identify a statistic based on a history of interference at the UE related to the interference metric before a current time slot; and
determine, based on the statistic, a predicted modulation and coding scheme (MCS) to include with the interference change report for consideration by the BS for a future time period.

22. The user equipment of aspect 21, wherein the predicted MCS comprises a first predicted MCS and the future time period comprises a first future time period, the processor further configured to:
determine, based on the statistic, a second predicted MCS to include with the interference change report for consideration by the BS, the second predicted MCS corresponding to a second future time period, the second future time period being after the first future time period.

23. The user equipment of any of aspects 21-22, wherein the statistic comprises at least one of a variance of interference power at the UE, a maximum of interference power at the UE over a past time period, a minimum of interference power at the UE over the past time period, a rank, a probability of interference change at the UE, a first average of interference over a first past time period, a second average of interference over a second time period that is greater than the first past time period, a calculated time duration between interference states at the UE, and relative ratios of eigen values of an interference covariance matrix across antennas.

24. A base station, comprising:
a transceiver configured to:
transmit, by the base station (BS) to a user equipment (UE), quantizing information for an interference metric into one of a plurality of interference states; and receive, by the BS from the UE, an interference change report in response to a trigger related to the interference metric tracked by the UE; and
a processor configured to:
predict a future interference condition at the UE based on the received interference change report; and
determine scheduling information based on the future interference condition,
wherein the transceiver is further configured to transmit the scheduling information to the UE.

25. The base station of aspect 24, wherein the transmission of the quantizing information further comprises transmitting a radio resource control (RRC) message, a medium access control control element (MAC-CE), or downlink control information (DCI) message comprising the quantizing information.

26. The base station of any of aspects 24-25, wherein the quantizing information comprises a threshold, and the receipt of the interference change report is based on the interference metric passing the threshold, wherein the processor is further configured to:
access, in the interference change report, a representation of an interference state from among the plurality of interference states that the UE has transitioned to from a prior interference state from among the plurality of interference states.

27. The base station of any of aspects 24-26, wherein the processor is further configured to:
access, in the interference change report, a current state index identifying an interference state from among the plurality of interference states, at a point in time that the trigger occurs.

28. The base station of any of aspects 24-27, wherein the interference change report comprises a statistic based on a history of interference at the UE related to the interference metric before a current time slot, wherein the processor is further configured to:
access a predicted modulation and coding scheme (MCS) included by the UE in the interference change report, the predicted MCS corresponding to a future time period,
wherein the determination of the scheduling information is based on the predicted MCS.

29. The base station of aspect 28, wherein the predicted MCS comprises a first predicted MCS and the future time period comprises a first future time period, the processor being further configured to:
access a second predicted MCS included by the UE in the interference change report, the second predicted MCS corresponding to a second future time period, the second future time period being after the first future time period.

30. The base station of any of aspects 28-29, wherein the statistic comprises at least one of a variance of interference power at the UE, a maximum of interference power at the UE over a past time period, a minimum of interference power at the UE over the past time period, a rank, a probability of interference change at the UE, a first average of interference over a first past time period, a second average of interference over a second time period that is greater than the first past time period, a calculated time duration between interference states at the UE, and relative ratios of eigen values of an interference covariance matrix across antennas.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method comprising:
   receiving, by a user equipment (UE) from a base station (BS), quantizing information for an interference metric into one of a plurality of interference states;
   tracking, by the UE, the interference metric of a channel condition at the UE;
   determining, by the UE, to send an interference change report in response to a trigger related to the interference metric based on the quantizing information; and
   transmitting, by the UE, the interference change report to the BS in response to the determining.

2. The method of claim 1, further comprising:
   receiving, at the UE from the BS, scheduling information for the UE based on the interference change report.

3. The method of claim 1, wherein the receiving further comprises receiving a radio resource control (RRC) message, medium access control control element (MAC-CE), or downlink control information (DCI) message comprising the quantizing information.

4. The method of claim 1, wherein the quantizing information comprises a threshold, further comprising:
   triggering, by the UE, the determining in response to the interference metric passing the threshold;
   identifying, by the UE, a transition from a first interference state from among the plurality of interference states to a second interference state from among the plurality of interference states based on a change to the interference metric; and
   encoding, by the UE prior to the transmitting, a representation of the second interference state into the interference change report.

5. The method of claim 1, further comprising:
   encoding, by the UE prior to the transmitting, a current state index identifying an interference state from among the plurality of interference states, at a point in time that the trigger occurs, into the interference change report.

6. The method of claim 1, wherein the determining further comprises:
   identifying, by the UE, a statistic based on a history of interference at the UE related to the interference metric before a current time slot; and
   determining, by the UE based on the statistic, a predicted modulation and coding scheme (MCS) to include with the interference change report for consideration by the BS for a future time period.

7. The method of claim 6, wherein the predicted MCS comprises a first predicted MCS and the future time period comprises a first future time period, the method further comprising:
   determining, by the UE based on the statistic, a second predicted MCS to include with the interference change report for consideration by the BS, the second predicted MCS corresponding to a second future time period, the second future time period being after the first future time period.

8. The method of claim 6, wherein the statistic comprises at least one of a variance of interference power at the UE, a maximum of interference power at the UE over a past time period, a minimum of interference power at the UE over the past time period, a rank, a probability of interference change at the UE, a first average of interference over a first past time period, a second average of interference over a second time period that is greater than the first past time period, a calculated time duration between interference states at the UE, and relative ratios of eigen values of an interference covariance matrix across antennas.

9. A method comprising:
   transmitting, by a base station (BS) to a user equipment (UE), quantizing information for an interference metric into one of a plurality of interference states;
   receiving, by the BS from the UE, an interference change report in response to a trigger related to the interference metric tracked by the UE;
   predicting, by the BS, a future interference condition at the UE based on the received interference change report;
   determining, by the BS, scheduling information based on the future interference condition; and
   transmitting, by the BS, the scheduling information to the UE.

10. The method of claim 9, wherein the transmitting the quantizing information further comprises transmitting a radio resource control (RRC) message, medium access control control element (MAC-CE), or downlink control information (DCI) message comprising the quantizing information.

11. The method of claim 9, wherein the quantizing information comprises a threshold, and wherein the receiving is based on the interference metric passing the threshold, further comprising:
    accessing, by the BS in the interference change report, a representation of an interference state from among the plurality of interference states that the UE has transitioned to from a prior interference state from among the plurality of interference states.

12. The method of claim 9, further comprising:
    accessing, by the BS in the interference change report, a current state index identifying an interference state from among the plurality of interference states, at a point in time that the trigger occurs.

13. The method of claim 9, wherein the interference change report comprises a statistic based on a history of interference at the UE related to the interference metric before a current time slot, further comprising:
    accessing, by the BS, a predicted modulation and coding scheme (MCS) included by the UE in the interference change report, the predicted MCS corresponding to a future time period, wherein the determining the scheduling information is based on the predicted MCS.

14. The method of claim 13, wherein the predicted MCS comprises a first predicted MCS and the future time period comprises a first future time period, the method further comprising:
    accessing, by the BS, a second predicted MCS included by the UE in the interference change report, the second predicted MCS corresponding to a second future time period, the second future time period being after the first future time period.

15. The method of claim 13, wherein the statistic comprises at least one of a variance of interference power at the UE, a maximum of interference power at the UE over a past time period, a minimum of interference power at the UE over the past time period, a rank, a probability of interference change at the UE, a first average of interference over a first past time period, a second average of interference over a second past time period that is greater than the first past time period, a calculated time duration between interference states at the UE, and relative ratios of eigen values of an interference covariance matrix across antennas.

16. A user equipment comprising:
a transceiver configured to receive, from a base station (BS), quantizing information for an interference metric into one of a plurality of interference states; and
a processor configured to:
track, by the user equipment (UE), the interference metric of a channel condition at the UE; and
determine to send an interference change report in response to a trigger related to the interference metric based on the quantizing information; and
wherein the transceiver configured to transmit the interference change report to the BS in response to the determination.

17. The user equipment of claim 16, wherein the transceiver is further configured to:
receive, from the BS, scheduling information for the UE based on the interference change report.

18. The user equipment of claim 16, wherein the transceiver is further configured to receive the quantizing information in a radio resource control (RRC) message, medium access control control ement (MAC-CE), or downlink control information (DCI) message.

19. The user equipment of claim 16, wherein the quantizing information comprises a threshold, the processor further configured to:
trigger the determination in response to the interference metric passing the threshold;
identify a transition from a first interference state from among the plurality of interference states to a second interference state from among the plurality of interference states based on a change to the interference metric; and
encode, prior to the transmission, a representation of the second interference state into the interference change report.

20. The user equipment of claim 16, wherein the processor is further configured to:
encode, prior to the transmission, a current state index identifying an interference state from among the plurality of interference states, at a point in time that the trigger occurs, into the interference change report.

21. The user equipment of claim 16, wherein the processor is further configured to:
identify a statistic based on a history of interference at the UE related to the interference metric before a current time slot; and
determine, based on the statistic, a predicted modulation and coding scheme (MCS) to include with the interference change report for consideration by the BS for a future time period.

22. The user equipment of claim 21, wherein the predicted MCS comprises a first predicted MCS and the future time period comprises a first future time period, the processor further configured to:
determine, based on the statistic, a second predicted MCS to include with the interference change report for consideration by the BS, the second predicted MCS corresponding to a second future time period, the second future time period being after the first future time period.

23. The user equipment of claim 21, wherein the statistic comprises at least one of a variance of interference power at the UE, a maximum of interference power at the UE over a past time period, a minimum of interference power at the UE over the past time period, a rank, a probability of interference change at the UE, a first average of interference over a first past time period, a second average of interference over a second time period that is greater than the first past time period, a calculated time duration between interference states at the UE, and relative ratios of eigen values of an interference covariance matrix across antennas.

24. A base station, comprising:
a transceiver configured to:
transmit, by the base station (BS) to a user equipment (UE), quantizing information for an interference metric into one of a plurality of interference states; and
receive, by the BS from the UE, an interference change report in response to a trigger related to the interference metric tracked by the UE; and
a processor configured to:
predict a future interference condition at the UE based on the received interference change report; and
determine scheduling information based on the future interference condition,
wherein the transceiver is further configured to transmit the scheduling information to the UE.

25. The base station of claim 24, wherein the transmission of the quantizing information further comprises transmitting a radio resource control (RRC) message, a medium access control control element (MAC-CE), or downlink control information (DCI) message comprising the quantizing information.

26. The base station of claim 24, wherein the quantizing information comprises a threshold, and the receipt of the interference change report is based on the interference metric passing the threshold, wherein the processor is further configured to:
access, in the interference change report, a representation of an interference state from among the plurality of interference states that the UE has transitioned to from a prior interference state from among the plurality of interference states.

27. The base station of claim 24, wherein the processor is further configured to:
access, in the interference change report, a current state index identifying an interference state from among the plurality of interference states, at a point in time that the trigger occurs.

28. The base station of claim 24, wherein the interference change report comprises a statistic based on a history of interference at the UE related to the interference metric before a current time slot, wherein the processor is further configured to:
access a predicted modulation and coding scheme (MCS) included by the UE in the interference change report, the predicted MCS corresponding to a future time period,
wherein the determination of the scheduling information is based on the predicted MCS.

29. The base station of claim 28, wherein the predicted MCS comprises a first predicted MCS and the future time period comprises a first future time period, the processor being further configured to:
access a second predicted MCS included by the UE in the interference change report, the second predicted MCS corresponding to a second future time period, the second future time period being after the first future time period.

30. The base station of claim 28, wherein the statistic comprises at least one of a variance of interference power at the UE, a maximum of interference power at the UE over a past time period, a minimum of interference power at the UE over the past time period, a rank, a probability of interference change at the UE, a first average of interference over a first past time period, a second average of interference over a second time period that is greater than the first past time period, a calculated time duration between interference states at the UE, and relative ratios of eigen values of an interference covariance matrix across antennas.

* * * * *